Aug. 31, 1965     H. N. CAPEN ETAL     3,204,186
ANTENNA UTILIZING THE HALL EFFECT
Filed Feb. 14, 1961     7 Sheets-Sheet 1

INVENTORS.
H. NORMAN CAPEN
FRED A. MODAVIS
BY LUCIO M. VALLESE

ATTORNEY

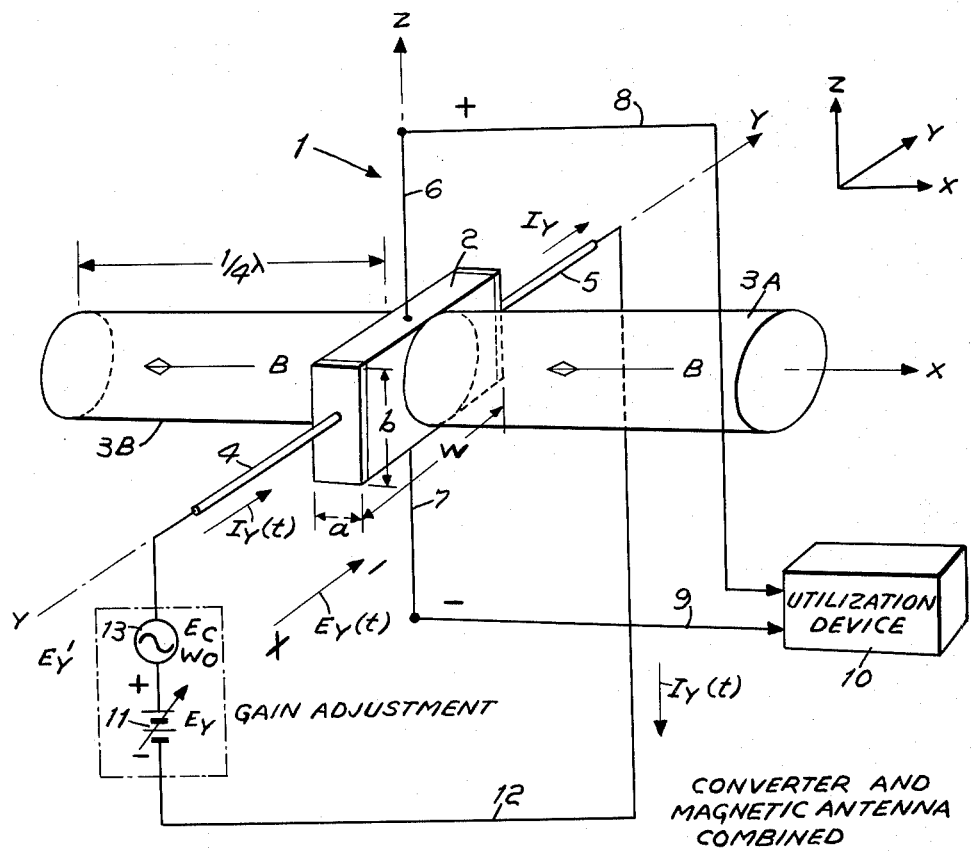

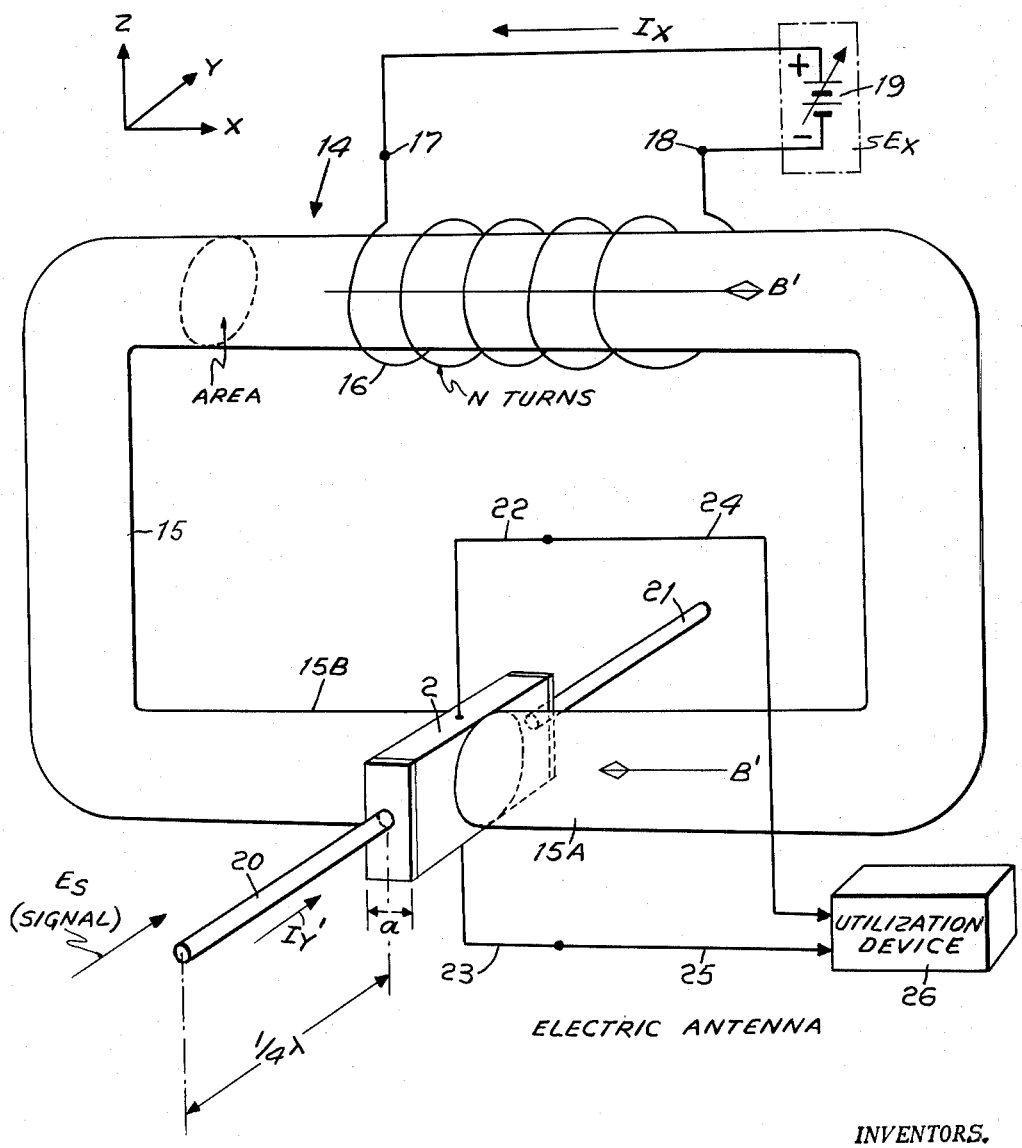

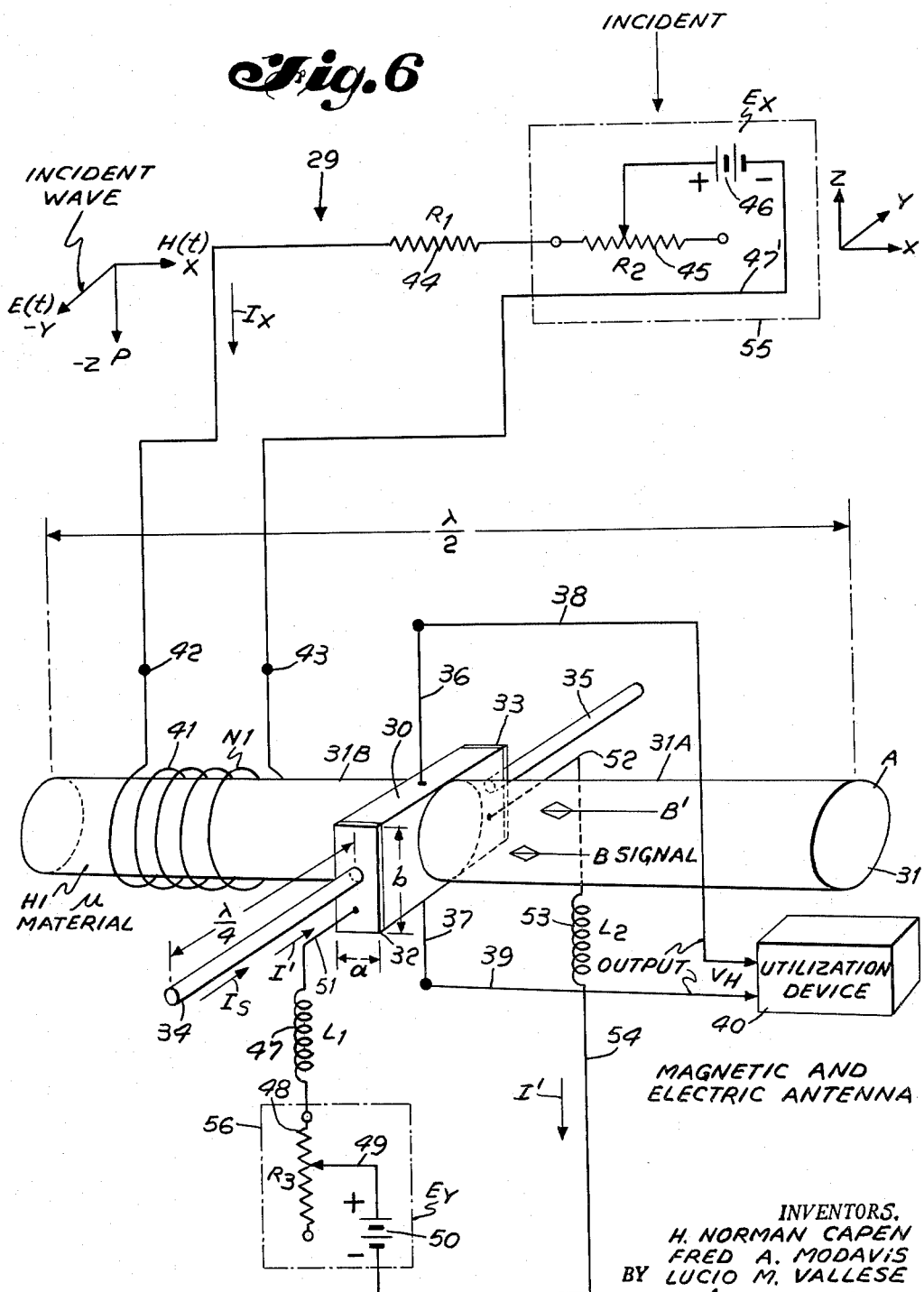

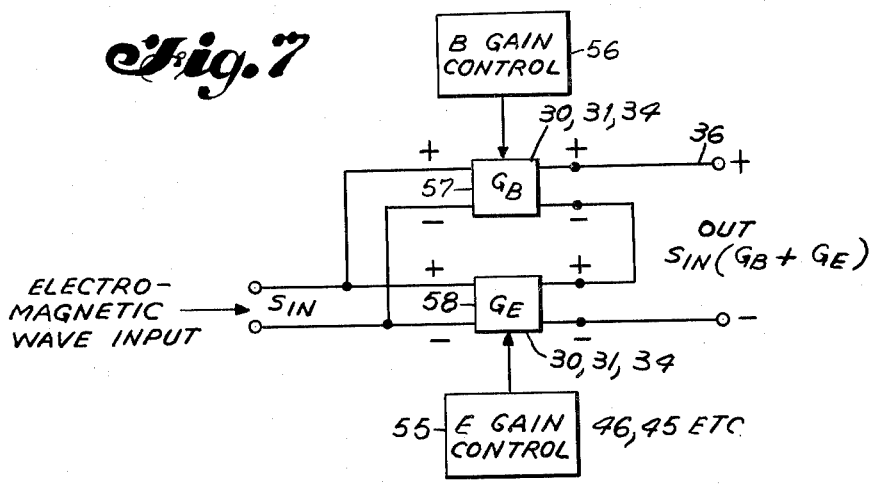
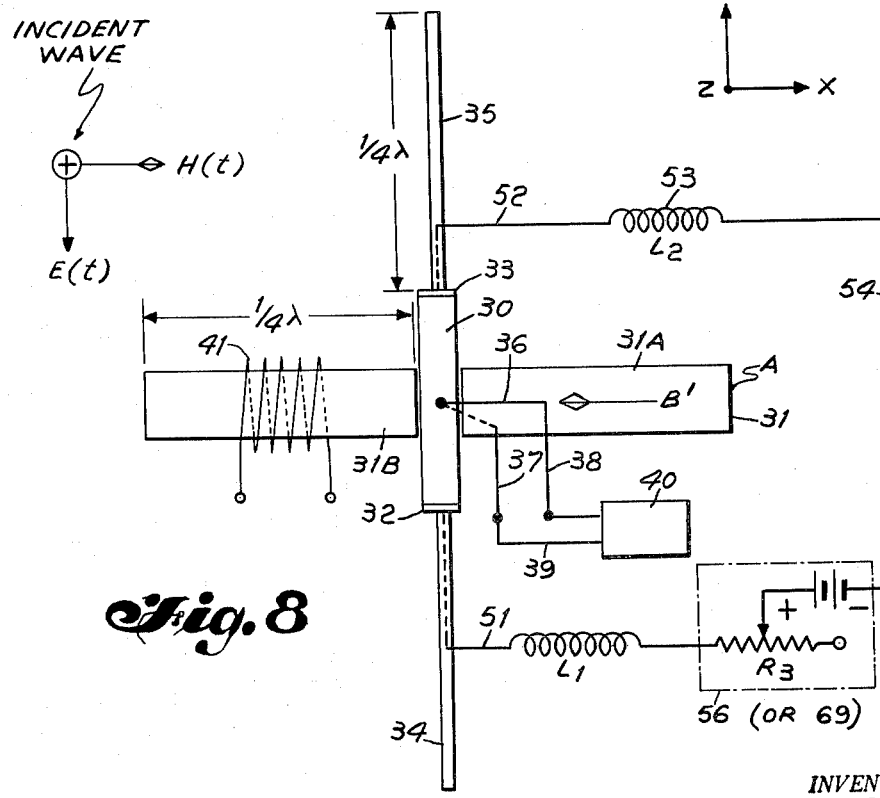

United States Patent Office 3,204,186
Patented Aug. 31, 1965

3,204,186
ANTENNA UTILIZING THE HALL EFFECT
Harold Norman Capen, Cedar Grove, and Fred A. Modavis, Wayne, N.J., and Lucio M. Vallese, Brooklyn, N.Y., assignors to International Telephone and Telegraph Corporation, Nutley, N.J., a corporation of Maryland
Filed Feb. 14, 1961, Ser. No. 89,167
3 Claims. (Cl. 325—448)

This invention relates to electrical transducers responsive to electromagnetic radiation and more particularly to transducers utilizing Hall effect phenomena in their operation.

In the past, a number of electrical devices utilizing the Hall effect have been constructed. Briefly described, the Hall effect is the observed phenomenon that if a magnetic field is applied perpendicular to a current flow in any conductor, the moving charges (which constitute the current) are deflected sideways and build up a potential difference between the two sides of the conductor. The creation of this transverse electric field (perpendicular to both the magnetic field and the original current flow) is called the Hall effect. The Hall effect is notable, among other things, for the fact that both a magnetic field and an electric field are involved in the production of this phenomenon. The prior art Hall effect devices, however, have principally used the magnetic properties of the phenomenon to operate their various devices. Microwave gyrators have been proposed, for example, utilizing the Hall effect, and control equipment for use in controlling the speed and load on electrical motors has been constructed in the past. But these devices are notable in that they do not utilize the full cooperation between the magnetic and the electrical phenomena exhibited by Hall effect materials.

The prior art devices known as antennas are multitudinous. Antennas responsive to electromagnetic radiation have been built in literally hundreds of forms and styles. It is notable in respect to prior art antennas, however, that these devices have concentrated principally upon utilizing and transforming only the electrical component of electromagnetic radiation. It is well known in the prior art that any electromagnetic radiation in space, in particular, must and always does have both an electric component and a magnetic component existing at the same time and in definite relationship to each other. But the prior art antennas have utilized only one of these components of electromagnetic radiation to achieve their operation.

Therefore, it is an object of this invention to provide a transducer of electromagnetic radiation which is responsive to, and which utilizes, both the magnetic and the electric components of electromagnetic radiation.

It is another object of this invention to provide a Hall effect antenna.

It is a further object of this invention to provide electrical apparatus which functions at one and the same time to serve as both an antenna and as a frequency converter of the incident radiation falling upon the apparatus.

It is an additional object of our invention to provide an antenna whose gain may be adjusted at will entirely through varying electrical parameters and without the necessity for changes in physical dimension or orientation.

It is a feature of this invention to provide an antenna which has a sample of Hall effect material located within a structure for focusing the magnetic component of incident electromagnetic radiation. This Hall effect material is also coupled to apparatus for furnishing an electric field to the Hall effect material. The Hall effect material is located also within a structure for focusing the electric field of the incident radiation. The magnetic structure and the electrical field structures are located at right angles to each other and the sample of Hall effect material. The output of this antenna represents a direct measure of the variation of both the electric and the magnetic components of the incident electromagnetic radiation.

It is another feature of this invention to provide a frequency converting antenna which has a sample of Hall effect material located within a structure for focusing the field of the incident electromagnetic radiation. Also coupled to the Hall effect material are variable control apparatus for providing a control field or fields within the Hall material. Connected to the control apparatus are appropriate local signal sources operating at desired frequencies. This arrangement provides an antenna output which represents not only the variation of the incident electromagnetic radiation but which characterizes the frequencies supplied by the selectively variable signal sources.

The above-mentioned and other features and objects of this invention will become more apparent by reference to the following description taken in conjunction with the accompanying drawings, in which:

FIG. 3 is a perspective view of an embodiment of the invention that acts as both a combined frequency converter and magnetic antenna;

FIG. 4 is a perspective view of an electric antenna utilizing the principles of our invention;

FIG. 6 is a perspective view of the preferred embodiment of the invention which functions as both a magnetic and electric antenna at the same time;

FIG. 7 is an electrical block diagram useful in explanation of the functioning of FIGS. 6 and 9;

FIG. 8 is a top plan view of the mechanical details of the antennas of the embodiments of FIGS. 6 and 9.

Figure 1:
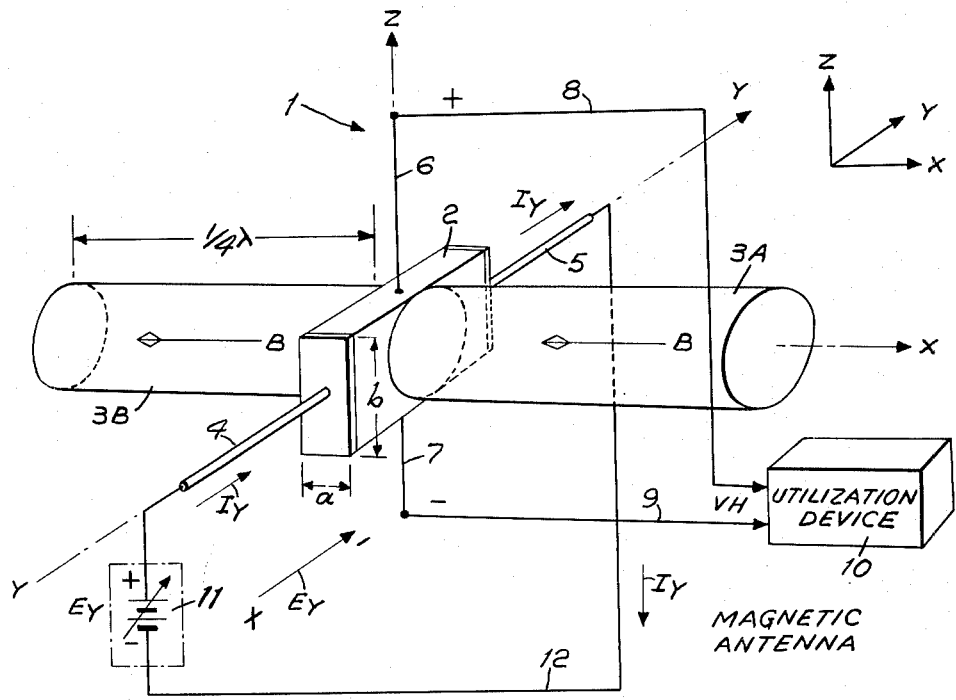
FIG. 1 is a perspective view of a basic embodiment of our invention.

Refer to FIG. 1. FIG. 1 illustrates a basic embodiment of a transducer of electromagnetic radiation which embodies our invention and, at the same time, will serve to illustrate the basic Hall effect phenomena. The Hall effect can be exhibited by any conductor or semiconductor. It is preferred to use semiconductors because for given values of current, $I$, and magnetic field intensity, $B$, certain semiconductor materials exhibit a much larger response than others but the Hall effect is exhibited by any current carrying conductor. Some materials which exhibit the Hall effect are antimony, cobalt, zinc and iron. Bismuth, copper, aluminum also exhibit the Hall effect. For better magnitude of results, a semiconductor, such as indium antimonide is suggested. The Hall effect itself is exhibited when a strip of material carrying an electric current, $I$, is longitudinally placed in a magnetic field, $B$, with the plane of the strip of material perpendicular to the direction of the flux field $B$. Points directly opposite each other on the edge of the strip perpendicular to both the direction of the current flow and the direction of the magnetic field will exhibit a difference of electric potential $V$. If these two points are connected to an indicating instrument or an amplifier, a detectable voltage will be noticed. To explain it slightly differently, the equal potential lines which are driving the current $I$ through the material will ordinarily run across the material at right angles to the edges but the magnetic field perpendicular to the current $I$ causes a skewing of the electric field into an oblique position and it is this skewed component of the electric field which gives rise to the Hall voltage between the orthogonal sides of the element.

FIG. 1 shows a transducer of electromagnetic radiation utilizing the Hall effect. The transducer is generally designated as 1. There is a sample of material 2 exhibiting the Hall effect. This material 2 may be any conductor or semiconductor but is preferably a semiconductor with a relatively large Hall constant, such as indium antimonide. Located on both sides of the Hall effect material 2 on the axis X are bars, 3a and 3b, of material of high permeability. The bars 3a and 3b serve to focus lines of magnetic flux indicated by the symbol B and the vector arrow shown within the bar. The bars 3a and 3b might be might be iron or ferrite, for example, with a relatively large value of permeability to magnetic flux. At right angles to the bars 3a and 3b, that is, at right angles to the flux B is shown a current $I_Y$ passing through the Hall effect material 2. Current $I_Y$ enters the Hall effect material 2 by lead 4 and leaves the Hall effect material 2 by lead 5. Thus leads 4 and 5 are ohmically attached to the Hall effect material 2. Thus, a current $I_Y$ will flow orthogonally to the flux lines B. The small reference direction vectors x, y and z in the upper right corner of the diagram are for convenience in establishing the relative directions. The same orientation in space is used in all the figures. These are two terminals 6 and 7 located on the remaining two sides of the six-sided Hall effect material 2. The leads 6 and 7 are firmly attached to the top and the bottom edges of the Hall effect material 2, at which the Hall effect voltage will be exhibited. The leads 6 and 7 represent the output voltage of the device, that is, the Hall effect voltage. The leads 6 and 7 are connected by leads 8 and 9 to a suitable utilization device 10. Device 10 might be the first amplifying stage of a radio receiver, for example, or it might be a sensitive meter, and its exact nature is not important to our invention.

The dimension of the sample of Hall effect material 2 is shown as a thickness $a$ in the direction of the flux B and as a height $b$ in the direction of the leads 6 and 7, that is, in the direction in which the Hall effect is produced. For the explanation of the operation of our device, assume that there is a flux B, where B is the magnetic flux density measured in Webers per square meter, and that a current $I_Y$ in amperes is flowing through the Hall effect material entering the lead 4 and leaving the lead 5. $V_H$ is the Hall voltage which will be exhibited at leads 6 and 7. Assume that the magnetic flux B and the current I are already established and the methods of establishing the current $I_Y$ and the magnetic flux density B be disregarded for the time being. We can relate the physical performance of the device and the Hall effect rather simply.

(1) $$\frac{V_H}{b} = R_H \times B \times J$$

where $V_H$ is the Hall voltage exhibited between the leads 6 and 7
$J$ is the current density in amperes per square meter
$R_H$ is the Hall constant.

$R_H$ has different values for different materials and it is desirable to use a material which has a relatively large value for $R_H$, the Hall constant. We have previously indicated that one such material is indium antimonide. Equation 1 states that the electric field intensity in the z direction, namely, $$\frac{V_H}{b}$$

in volts per meter is equal to the product of the flux density B times the current density J perpendicular to the flux density B multiplied by a conversion constant $R_H$ which depends upon the particular type of material used and the system of electrical uits which is used. We can rewrite Equation 1 to show more clearly some of the aspects of our invention.

(2) $$V_H = R_H \times B \times J \times b$$

We also note that (3) $$J = \frac{I_Y}{\text{area}} = \frac{I_Y}{a \times b}$$

That is, the area of the Hall effect material is simply the area $ab$ across which the current $I_Y$ passes transversely, Then, we can replace the current density J in amps per square meter by the quantity $$\frac{I_Y}{ab}$$

still in amperes per square meter, where $a$ and $b$ are measured in meters.

(4) $$V_H = R_H \times B \times \frac{I_Y}{a \times b} \times b$$

It will be readily seen that the dimension b cancels from the equation.

(5) $$V_H = R_H \times B \times \frac{I_Y}{a}$$

Equation 5 indicates that the magnitude of the output voltage $V_H$ in volts at terminals 6 and 7 is equal to the product of the flux density B times the current $I_Y$ in amperes divided by the dimension "a" parallel to the flux density B and multiplied by a conversion constant $R_H$. The Equations 1, 2, and 5 rae basic to the Hall effect and they also govern all the other embodiments of the device which are shown.

Now refer again to FIG. 1. In FIG. 1 is shown an adjustable source of electric potential 11 denoted as $E_Y$ connected in series to drive current $I_Y$ through the leads 4 and 5. The battery or power supply 11 with value $E_Y$ will drive the current $I_Y$ through the sample 2 of Hall effect material. Thus, we have established how the current $I_Y$ may be supplied. Assume now that there is an incident electromagnetic wave falling upon the transducer 1. It is well known in the prior art that every traveling electromagnetic wave no matter what its frequency or source has an E component, the electric component, and an H component, the magnetic component, traveling physically at right angles to each other in space and in time phase with each other. If the incident wave varies in time at a certain frequency, the E vector and the H vector both decrease and increase together at the same time in time phase and they always remain at right angles to each other in space. If the antenna is used to detect this incident electromagnetic radiation, the flux density B may be supplied by the incident electromagnetic radiation. Here the antenna is so oriented that the H field component of the wave is parallel to the axis of the bars 3a and 3b. These have high magnetic permeability and provide a concentration of the magnetic flux lines, with a consequent enhancement of the amplitude of the H vector which flows through the Hall plate perpendicularly to the current $I_Y$. It can be readily seen that by supplying the current $I_Y$ in the Hall effect material 2, the incident radiation will have its magnetic component H concentrated by the bars 3a and 3b of high permeability providing a flux density B at right angles to the current $I_Y$. Hence, a Hall voltage $V_H$ will be produced which varies directly according to the variations in the received signal radiation. The received signal radiation might be radio waves in the ordinary broadcast bands, for example, or it might be at a somewhat higher frequency. But the output terminals 6 and 7 will have a Hall voltage which varies in time just as the incident radiation does according to its magnetic component H. The upper frequency of the antenna is limited by the frequency response of the Hall plate. This voltage at terminals 6 and 7 is conducted by the leads 8 and 9 to the suitable utilization device 10 which may be a radio receiver, for example. Thus, FIG.

1 shows a complete embodiment of a magnetic antenna, that is, a transducer which converts incident electromagnetic radiation into an output voltage according to the variation of the magnetic component, H, of the incident radiation.

Figure 2A:
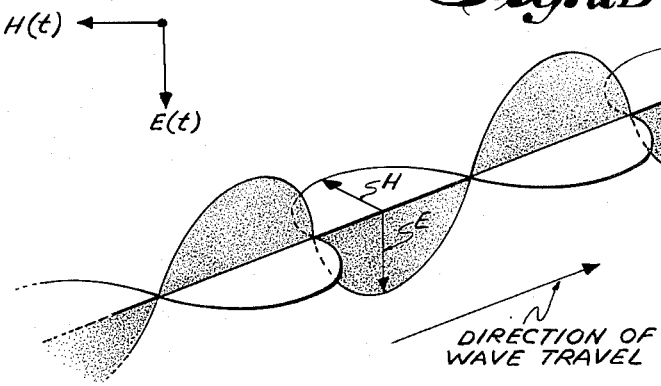
FIGS. 2A and 2B are representations of a traveling electromagnetic wave.
Figure 2B:
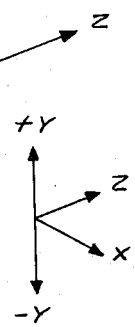

To aid the visualization of the reader, FIG. 2A shows the vector representation of the electric field and the magnetic field E and H of a wave which is traveling directly out of the paper towards the reader, as shown by the dot which represents conventionally the tip of an "arrow" coming toward the reader. In FIG. 2B is shown a perspective view of a visualization of the same electromagnetic wave traveling through space showing the orthogonal relationship between the electric component and the magnetic component of the radiation and showing how they vary together and grow and decay in time phase with each other. Thus, the apparatus of FIG. 1 is eminently suited for picking up such radiation.

It should also be noted the transducer or antenna of FIG. 1 can be made to have a very high gain and a gain which is readily controllable by purely electrical means.

(6) $$B = \mu H$$

Equation 6 states that magnetic flux density B is the product of the permeability $\mu$, of the bar material such as 3a and 3b which is concentrating the lines of magnetomotive force H where H is the magnetic intensity of the incident wave as shown in FIG. 2B. The magnetic intensity H is measured in ampere-turns per meter, which in terms of dimensions is simply amperes per meter. It can be seen that for a material, such as iron or ferrite, the value of $\mu$ is something like 2,000 to 4,000, for example. This high value of $\mu$ in itself amplifies the flux density B from a given incident magnetic wave with the given value of H magnetic intensity. The relative permeability $\mu$ may acquire very large values depending on the material, the frequency range of utilization, the dynamic range, etc. For example, some ferrite materials are available which possess values of $\mu$ of the order of 4,000 and higher, with very small high frequency losses. In addition, it can be seen from Equations 2 and 5 that for any particular value of B from a particular electromagnetic wave with a given strength, the magnitude of the Hall voltage $V_H$ may be increased directly by increasing the current, such as $I_Y$. Thus, the adjustable potential source at 11, $E_Y$, and the leads 4, 5 and 12 provide a gain control for the transducer 1. The larger the current $I_Y$ is made by using a larger voltage $E_Y$, the larger will be the output $V_H$ across the leads 6 and 7. An antenna or transducer with a very high gain may be obtained very simply in this manner. The only practical limitation on the value of the current $I_Y$ is the current carrying capacity of the material 2 and the heat which must be dissipated due to resistance heating losses. By a suitable cooling method (not shown), heat may be readily dissipated from the slab of material 2 so that an adjustable high gain antenna having adjustable gain and arbitrarily high gain has been created. Assume, for example, that the incident electromagnetic radiation is a sine wave at a frequency $\omega_s$. Then we can write for the value for the magnetic intensity H at each instant (7) $$H(t) = |H_m| \sin \omega_s t$$

$H_m$ is the maximum value of the magnetic intensity and $t$ represents time. Such a sine wave electromagnetic radiation will produce a Hall voltage which is a function of time given by the Equation 8.

(8) $$V_H(t) = R_H (\mu |H_m| \sin \omega_s t) \frac{I_Y}{a}$$

This is merely substituting Equation 7 into Equation 5 to produce Equation 8. It can be readily appreciated that the time varying Hall voltage $V_H(t)$ is varied in time according to the variation of the incident radiation as indicated by the expression 8 and in addition, the magnitude of the voltage $V_H$ appearing across the terminals 6 and 7 is amplified by the product of $\mu$ times the current $I_Y$. The current $I_Y$ is readily controllable at will and by selecting an appropriate material, such as iron or ferrite, the value of $\mu$ may be made quite large so that an antenna of considerable gain which is readily controllable is achieved. The dimensions and units of the Hall constant $R_H$ are given by Equation 9.

(9) $$R_H = \frac{E_z}{J_y \times H_z}$$

Thus, the Hall constant is given in volts per meter ($E_z$) divided by the product of amperes per square meter ($J_y$) times amperes per meter ($H_z$). $R_H$ reduces to units of meters cubed per coulomb. A typical value for $\mu$ would be 4,000 for ferrite and a typical value for $R_H$ would be 1 times $10^{-4}$ meters cubed per coulomb. Thus, $R_H$ is a function of the majority carrier concentration of the semiconductor. Thus, $R_H$ is given approximately for semiconductor type materials by $$R_H \cong \frac{3\pi}{8pq} \text{ for P-type material}$$

and $$R_H \cong \frac{3\pi}{8nq} \text{ for N-type material}$$

where $p$ is the number of positive type carriers and $n$ is the number of negative type carriers in the material. It should be clearly understood with respect to all of the figures that the reference directions $x$, $y$ and $z$ are given purely for heuristic reasons and that the actual orientation of the antenna in space can be any convenient one. It is only necessary that the flux density vector, the current and the field of the Hall voltage be mutually perpendicular or orthogonal each with respect to the other. It is well to note also in FIG. 1 that the form and dimensions of the two portions 3a and 3b may be designated appropriately so that the concentration of magnetic density may be improved. In particular, the length of the two portions 3a and 3b is each made one quarter of a wavelength, so that a one-half wavelength dipole antenna is intimately connected to the Hall sample 2. This will provide a relatively more efficient antenna because the incident lines of magnetic flux density B will more readily be linked and concentrated through the material 3a and 3b. The flux lines B may complete their closed circuit through the air and the complete path of the flux lines will be through the air, through the material 3a, through the Hall effect material 2, through the bar 3b and back through the air to form a closed loop of flux. Alternatively, the air portion of the circuit may be minimized in order to reduce the magnetic reluctance.

In FIG. 3, we again show a sample of Hall effect material 2 located in the pole gap between two portions of magnetic material of high permeability 3a and 3b. The output leads are the terminals 6 and 7 at right angles to the current terminals 4 and 5 and the direction of the flux B. The output terminals 6 and 7 are connected by leads 8 and 9 to a suitable utilization device 10 which might be a radio receiver or a meter. However, the gain control circuit 11 which supplies the testing or sampling current $I_Y$ from a source of electromotive force $E_Y$ is connected in series to a generator 13 of electromotive force $E_C$. The generator $E_C$ may put out an electric voltage at a frequency $\omega_0$, for example. The source $E_Y$ provides a steady D.C. component of voltage and the source 13, $E_C$, will provide a complex time varying waveform at the frequency $\omega_0$. Generator $E_C$ and the source $E_Y$ are connected in series with each other and then in series through the leads 4, 5 and by the return lead 12 back to the return voltage side of the source $E_Y$. It will now be seen that the current $I_Y$ which is sent through the Hall effect material 2 to provide the required current to produce the Hall voltage $V_H$ at the terminal 6 and 7 may be modulated or varied in time according to the signal produced by the generator $E_C$. For example, suppose the voltage $E_C$ is given by Equation 10.

(10) $$E_C = |E_m| \sin \omega_0 t$$

In other words, $E_C$ is a sine wave carrier signal at the frequency $\omega_0$. Then, the Hall voltage $V_H$ will be modulated or varied at the carrier frequency $\omega_0$ and in addition will have the amplitude modulation imposed by the incident electromagnetic radiation. Thus, the voltage at 6 and 7 will be a signal at the carrier frequency $\omega_0$ with the impressed intelligence voltage from the signal magnetic field $B$. Equation 11 gives the output. Thus, $$V_H(t) = \frac{R_H}{a}[\mu|H_m|\sin(\omega_s t)] \times \left[\frac{E_Y}{R} + \frac{|E_m|}{R}\sin(\omega_0 t)\right]$$
(11)

where R is the resistance of the Hall effect material in the sample 2. R is simply the volume resistance and may be found from the resistivity and the dimensions of the sample 2. The signal output $V_H(t)$ at the terminals 6 and 7 will contain the component at the carrier frequency $\omega_0$ and an upper sideband at the frequency $\omega_s + \omega_0$ and a term at the lower sideband frequency $\omega_0 - \omega_s$. $\omega_0$ is the carrier frequency and $\omega_s$ is the signal frequency of the incident radiation. It can thus be seen that the apparatus of FIG. 3 is acting as both an antenna with adjustable gain and as a modulator whose output is modulated at the carrier frequency $\omega_0$. All the modulation products are multiplied by the gain given by $$R_H \times \mu \times \frac{E_m}{Ra}$$

The source $E_C$ of carrier voltage might have frequency $\omega_0$ to the IF frequency, that is, the particular frequency used for the intermediate amplification. Thus, the apparatus of FIG. 3 is a combined magnetic antenna and frequency converter or modulator and as such it acts in a way similar to a first detector, for example, in a superheterodyne receiver, and the utilization device 10 might be the stages of the IF amplifier. Note that the gain of the antenna of FIG. 3 is controllable by varying the value of the electromotive force 11, $E_Y$, and that the modulation introduced can be any signal that is provided by the signal generator $E_C$. Impressed upon the signal $E_C$ will be the information obtained from the incident radiation and the products of these two signals will appear at the Hall output voltage terminals 6 and 7. In FIGS. 1 and 2, we have shown the Hall effect terminal 6 being positive with respect to the Hall terminal 7 for D.C. conditions. This is the case for so-called positive Hall effect materials, such as antimony, cobalt, zinc or iron. The polarity is reversed for certain other materials, such as bismuth, platinum, copper and aluminum which are known as negative Hall effect materials. The polarity at the Hall effect terminals 6 and 7, of course, reverses if the magnetic flux B reverses or if the current I reverses. For this reason, a varying electromagnetic wave can be detected as indicated above and also modulation can be impressed upon the output by varying the current I. The actual D.C. polarity at the terminals 6 and 7 makes little difference and if the D.C. polarity should be desired to be reversed, the terminals 8 and 9 can simply be reversed at the utilization device 10 to reverse the polarity. FIGS. 1 and 3 have illustrated embodiments of our invention which provide transducers of electromagnetic radiation which detect the magnetic component of the incident wave and convert this into an output Hall voltage. In the case of FIG. 3, a modulation signal has also been impressed upon the Hall output voltage by varying the sampling current I.

In FIG. 4, it is now shown that the converse process may be performed to give another highly important type of transducer of electromagnetic radiation again utilizing the Hall effect. In FIG. 1 it should be noted the supply of electromotive potential 11 produced the electric field $E_Y$ and caused the current $I_Y$ to flow through the sample. Suppose now that a constant sampling magnetic field $B'$ were provided to provide an always present flux $B'$ while the incident radiation was used to produce an electric signal field $E_S$ to induce a signal current $I_Y'$. Such a structure is shown in FIG. 4. A sample of Hall effect material 2 is shown as before. The transducer is indicated generally as 14. There is shown a closed loop or a closed bar 15 of a magnetic material of high permeability, such as iron or ferrite. The Hall effect sample 2 is located in a suitable gap between the arms 15a and 15b of the loop of magnetic material 15. However, located at any convenient position along the magnetic loop 15 is a coil 16 with terminals 17 and 18. The coil 16 is wrapped around the magnetic rod or structure 15. Connecting to the terminals 17 and 18 is a variable or adjustable source of electromotive force $E_X$ shown as 19. The supply source of voltage 19, by its electromotive force, $E_X$, drives a current $I_X$ into the terminal 17 through the turns of the coil 16 and back through the terminal 18 to the other terminal of the supply $E_X$. The current $I_X$ in the coil 16 causes a magnetic flux density $B'$ to exist in the magnetic rod or bar 15. This flux density $B'$ passes in a complete circuit through the arm 15a through the Hall effect material 2 and returns by the arm 15b to its source, the coil 16. Thus, there is provided a method for furnishing a steady but adjustable source of electromagnetic potential, that is, a magnetomotive force $B'$. There is also provided a dipole antenna 20–21 with a length of one-half wavelength at frequency which it is desired to detect. The dipole 20 is made of a rod or bar of conductive material, such as copper or aluminum. Directly opposite the dipole 20 on the opposite side of the sample 2 is firmly attached a second dipole 21, also made of conductive material and with the same length (one-quarter wavelength) as the first dipole 20. The axis of the dipoles 20 and 21 is perpendicular to the direction of the provided flux density $B'$ as shown, and the magnetic loop and the electric structure of 20 and 21 and the Hall material 2 are at right angles to each other. On the remaining two surfaces of the sample 2 of Hall material are attached the output leads 22 and 23 and the surfaces to which the leads 22 and 23 are attached are at right angles to both the path of the magnetic flux $B'$ through the structure 15 and at right angles to the axis (the Y axis) of the electric dipole structure 20 and 21.

Now assume that electromagnetic radiation is incident on the antenna of FIG. 4. The output leads 22 and 23 where the Hall voltage will be exhibited are connected by leads 24 and 25 to a suitable utilization device 26. The utilization device 26 might be the first stage of amplification of a radio receiver, for example. The electric field component $E_S$ of the incident electric wave will induce a current indicated as $I'_Y$ running through the half wavelength dipole structure 20 and 21. This will cause an induced current $I'_Y$ to pass through the Hall effect material 2 at right angles to the existing magnetic flux $B'$. Thus, the dipoles 20 and 21 act as an antenna, or concentrator, of the electric field component of the incident radiation. Every traveling electromagnetic wave has both an electric field component and a magnetic field component as previously mentioned. At the output terminals 22 and 23, a Hall effect voltage $V_H$ will appear in accordance with Equation 5 above. Equation 5 is rewritten below as Equation 12 to indicate that the current $I'_Y$ is now induced by the electric field $E_S$ of the incident electromagnetic wave and the current $I'_Y$ will be the electric field intensity $E_S$ divided by the volume resistivity R of the Hall effect sample 2. Thus, if A is a proportional factor, Equation 12 is

(12) $$V_H(t) = A R_H B' \times \frac{1}{a} \times \frac{E_S(t)}{R}$$

where $E_S(t)$ is the time variation of the electric field component $E_S$ of the incident radiation. It can be readily seen that the Hall effect voltage at 22 and 23 will vary as the time variation of the electric field $E_S(t)$ of the incident radiation. Thus, FIG. 4 provides a transducer of the electric field component of the incident radiation, whereas FIGS. 1 and 3 provided transducers of the magnetic field component of the incident radiation. It can be readily appreciated from Equation 12 that the sampling flux density B' may be readily increased by increasing the voltage of the potential source 19, $E_X$. Hence, the gain of the transducer of FIG. 4 is a gain controllable purely by electrical means and the only practical limitation upon the gain of this antenna is the size of the voltage $E_X$, the saturation of the magnetic material and the amount of current it is desired to pass through the coil 16 to generate the magnetomotive force B'. Extremely large fields may be induced within the sample 2 by this method. Likewise, by simply turning the voltage $E_X$ to zero for example, the output of the antenna may be made zero and the antenna may be shut off by simply not providing a sampling magnetic field B'. The gain of the antenna will be further enhanced by the directive gain of the electric dipole structure 20 and 21. A half-wave dipole normally has a gain of 1.64 as compared to an anisotropic source with the gain of 1.0. This gain of the antenna by concentrating the electric field will show up in the magnitude of the term $E_S(t)$ in Equation 12 and the functioning of FIG. 4 does not need further elaboration for an appreciation of its operation based on the discussions of FIGS. 1 and 3 which has gone before.

In FIG. 4, the coil 16 has a total of N turns. The magnetomotive force H' generated by the current $I_X$ is $I_X$ times N amperes turns. Resulting magnetic flux density is given by Equation 13, namely, $$(13) \qquad B' = \mu \frac{H'}{\text{area}} = \mu \frac{I_x \times N}{\text{area}}$$

where the area is the cross-section of the magnetic structure 15, and $\mu$ is the value of the permeability of the material 15. $\mu$ will generally be on the order of several thousand for iron or ferrite. Hence, the current $I_X$ is given by Equation 14.

$$(14) \qquad I_X = \frac{E_X}{R16}$$

where R16 is the resistance of the coil 16. Hence, by varying $E_X$, it can be seen through Equations 13 and 14 that the sampling magnetic flux density B' may be varied at will and the magnitude of the output Hall voltage $V_H$ at terminals 22 and 23 can be made virtually as large as desirable by providing a large voltage $E_X$ at 19 and supplying a large current $I_X$ to make B' quite large. It can be appreciated that FIG. 4 shows the converse apparatus for the process illustrated in FIG. 1. In other words, FIG. 4 is an electric antenna in that it detects, amplifies and transduces the electric compontnt of the incident radiation as just discussed. FIG. 1, on the other hand, was shown to be a magnetic transducer or antenna. The apparatus of FIG. 1 detects, amplifies and transduces the magnetic component of the incident radiation. Likewise, FIG. 3 showed an embodiment which acted as a combined magnetic transducer and modulator or frequency converter. Now, in FIG. 5, we will describe apparatus which performs the converse of FIG. 3, that is, it is a transducer of the electric component of the incident electromagnetic radiation and, at the same time, it is a modulator or frequency converter.

Figure 5:
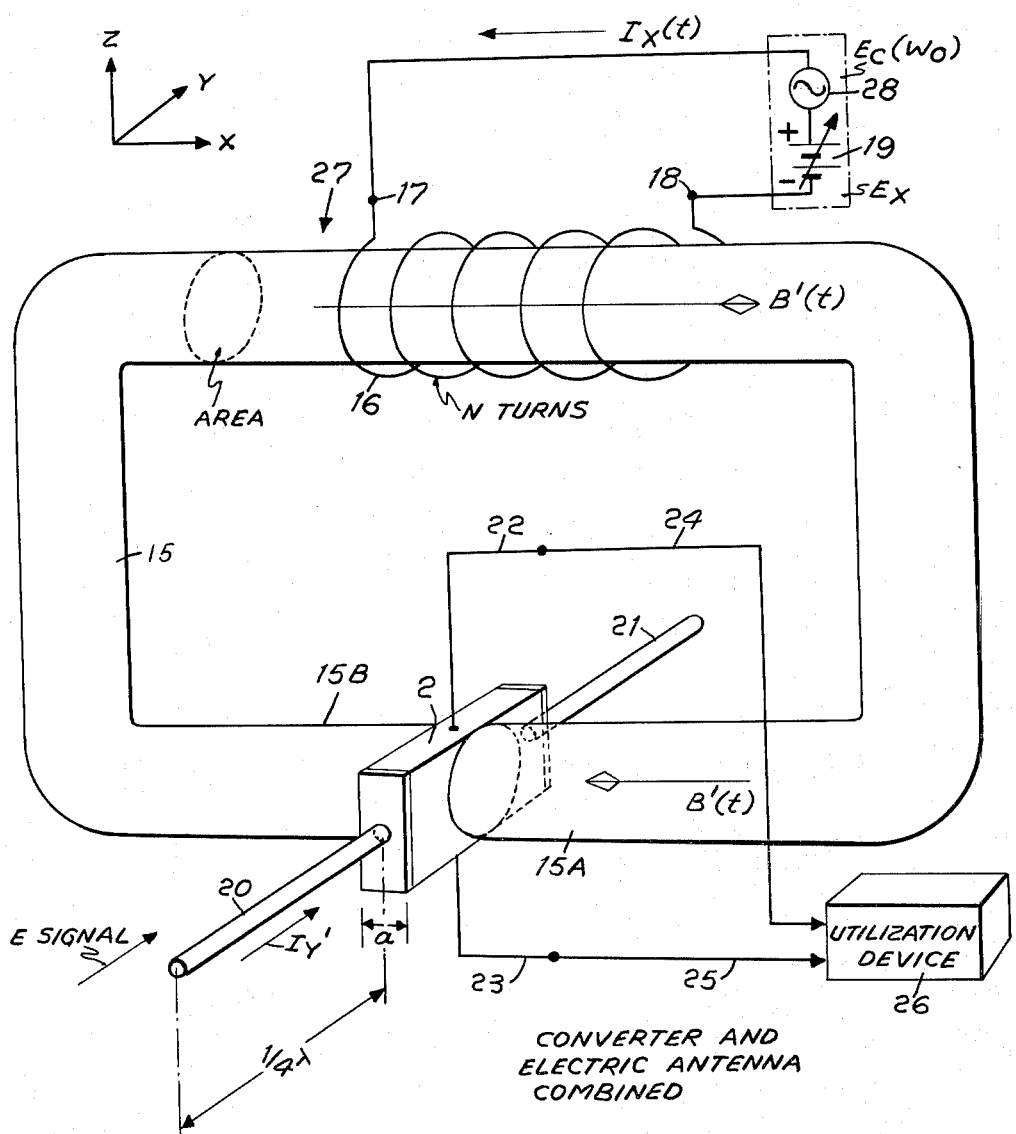
FIG. 5 is a perspective view of apparatus which acts as a combined frequency converter and electric antenna.

FIG. 5 shows the same physical transducer structure as shown in FIG. 4. The transducer of FIG. 5 is indicated generally as 27. A sample of Hall effect material 2 is located within the air gap of the magnetic loop material 15. However, the coil 16 which provided the magnetomotive sampling force is connected at terminals 17 and 18 in series to a signal generator $E_C$, element 28, and the signal generator 28 is in turn connected in series with an adjustable source of electromotive potential $E_X$ shown as 19. The adjustable voltage source $E_X$ as before provides for adjusting the gain of the antenna as indicated by Equations 13 and 12. This carrier generator 28 producing the time varying voltage $E_C$ causes a time varying component of current to be present in the current $I_X$ in the coil 16. As a result, $I_X$ is now given by Equation 15.

$$(15) \qquad I_X(t) = \frac{E_X}{R} + \frac{E_{cm}}{\sqrt{R^2 + \omega_0^2 L^2}} \sin(\omega_0 t + \phi)$$

Equation 16 indicates that L, the inductance of the coil 16, and the frequency $\omega_0$ of the signal generator $E_C$ will determine the time varying component of the current $I_X(t)$. The D.C. component of the coil current $I_X$ will be as indicated in Equation 14. Thus, the output voltage at terminals 22 and 23 will be modulated at the frequency $\omega_0$ of the signal generator $E_C$. At the same time the voltage at 22 and 23 will be modulated by the signal as indicated in the variations of the electric field of the incident radiation. Thus, the signal due to the incident radiation will be riding on top of the carrier frequency $\omega_0$ supplied by the signal generator 28. The utilization device 26 might be the first stage of the IF amplifier for a radio or radar receiver, for example, and the conversion to the IF frequency has been already accomplished. FIG. 5 shows a combined electric antenna utilizing the Hall effect and a frequency converter which in one step detects, amplifies and frequency converts the incident radiation. It can be appreciated that FIG. 5 represents the converse process of that illustrated in FIG. 3.

It has been stated that every plane traveling electromagnetic wave always has both an electric component and a magnetic component and they are in time phase with each other and at right angles in space. It is these properties of the orthogonal relationships in electromagnetic radiation and the required orthogonal relationships to produce the Hall effect which leads to an embodiment of our invention which detects and responds to both the electric component and the magnetic component of the incident radiation. FIG. 6 shows a transducer illustrated generally as 29 which combines all the advantages of FIGS. 1 and 4 as well as providing a number of other highly desirable features. FIG. 6 shows an embodiment of our invention which is a combined magnetic and electric antenna which responds to both the electric component and the magnetic component of the incident radiation. There is shown a sample of Hall effect material 30 placed in the air gap or space of a magnetic bar composed of material of high permeability 31. The Hall effect material 30 is located between the arms 31a and 31b of the magnetic focusing bar 31. The material 31 may be iron or ferrite or other material of high permeability and low loss. On the ends of the Hall effect material 30 are located two relatively thin strips or coats of conductor 32 and 33. The electrodes 32 and 33 might consist of a thin deposited coating of copper or aluminum, for example, and insure that ohmic and uniform electrical contacts will be made over the entire end of the Hall effect material 30. Firmly attached to the electrodes and the Hall effect material are dipoles 34 and 35. The dipoles 34 and 35 are of equal length and may be one quarter of a wavelength long. The dipoles are made of a conductive material, such as copper or aluminum, so as to concentrate the electric field of the incident radiation. The dipoles 34 and 35 as in the other structures are at right angles to the magnetic loop 31, 31a, 31b. At right angles to both the dipoles 34 and 35 and the magnetic loop 31 are the output Hall leads 36 and 37. The axis of the leads 36 and 37 is at right angles to the magnetic loop 31 and the electric dipoles 34 and 35. The output Hall voltage leads 36 and 37 are connected by suitable leads 38 and 39 to a suitable utilization device indicated at 40. As before, the utilization device 40 may be the input amplification stage of a radio or radar receiver or it might be a meter.

Equation 5 states that a Hall voltage will be produced in a conductor if a current I flows through the Hall material at right angles to a magnetic field B flowing through the Hall effect material. In other words, to detect an incident electric field on the Hall effect material, we must supply a sampling magnetic field. Conversely to detect an incident magnetic field on the Hall effect material, it is necessary to supply a sampling current driven through the Hall effect material at right angles to the magnetic flux field. The structure of FIG. 6 supplies both a sampling magnetic field indicated as B′ and a sampling current I′. As a result, the Hall effect voltage produced at the terminals 36 and 37 will contain and be responsive to both a voltage produced by the magnetic component of the incident radiation and in time phase and in aiding polarity the Hall effect voltage at 36 and 37 will contain a component induced by the incident electric field component of the incident radiation. It should be also noted that the orthogonal relationship between the electric and the magnetic components of every traveling electromagnetic wave are exactly and especially suited to be picked up and detected by an orthogonally related structure which is required for the Hall effect, namely, the magnetic bar 31 orthogonally related to the electric structure 34 and 35 which is orthogonally related to the output structure 36 and 37. To provide a sampling magnetic field so that the electric field of the radiation may be measured, the coil 41 is provided with terminals 42 and 43. Coil 41 is wound on the magnetic material 31 to provide a source of magnetomotive force B′ so that the electric field component of the signal will be able to produce a component of the Hall voltage at terminals 36 and 37. Connected to the terminals 42 and 43 of the coil 41 is a series circuit composed of resistor 44 designated as R1, a potentiometer 45 designated as R2, a source of electromotive force 46 designated as $E_X$ and a return lead 47′ to complete the circuit. This voltage source $E_X$ drives an adjustable current $I_X$ through the resistor R1 and through the coil 41. The coil 41 has N1 turns. The current $I_X$ is designated in that manner to indicate that it establishes a magnetic flux density B′ which acts in the X-coordinate of the Hall effect material 30. The value of the field B′ is approximately $$\frac{MNI_X}{area}$$

webers per square meter. The potentiometer R2 with one terminal left disconnected provides a convenient method for varying the total resistance in the coil circuit and thereby controlling the magnitude of the current $I_X$ which, in turn, controls the magnitude of the sampling flux field B′ produced by the current $I_X$ in the coil 41. The electronic component $E_S$ of the incident electromagnetic radiation will induce in the dipoles 34 and 35 a current $I_S$. This induced current which is caused by the electric field $E_S$ of the signal, that is, of the incident radiation, will flow through the sample along the dipole 34 through the sample 30 and along the dipole 35 and vice versa at right angles to the sampling flux field B′. According to Equation 5 and in view of the previous discussion, at the terminals 36 and 37 a Hall voltage will be produced which varies directly according to the value of the induced current $I_S$ due to the electric field of the signal. This Hall voltage output signal is carried to the utilization device 40 by the leads 38 and 39. It should be noted that as shown in connection with FIG. 4, the voltage source 46 and the rest of the coil circuit 55 connected to the coil 41 provide for a controllable and virtually unlimited gain for the detection of the electric component of the signal wave. The only practical limitation on the gain of the detection of the electric component is a question of convenience in determining how large a current $I_X$ should be driven through the coil 41.

The large permeability of the magnetic loop 31 also tends directly to multiply the electric field gain of the antenna.

Referring again to Equation 5, it can be seen that if a sampling current, such as the current $I_Y$ shown in FIG. 1, can be provided to the Hall material 30 in FIG. 6 then the signal induced variation of the flux B signal in the Hall material may be used to give an additional signal component in the Hall output voltage $V_H$ at the terminals 36 and 37. The apparatus for providing a sampling supplied current I′ is shown as the inductor 47 connected to the potentiometer 48 with the wiper 49 of the potentiometer 48 connected in series to a source of electromotive potential 50 generally indicated as $E_Y$. The inductor 47 is connected to lead 51 which is firmly attached to the electrode 32 on the one end of the sample 30 and at the other end lead 52 is attached to the electrode 33. Lead 52 is connected to a second inductor 53 and then by the return lead 54 back to the source of potential 50 forming a complete series circuit so that the electromotive force $E_Y$ will drive a current I′ through the lead 51 through the sample 30, out the electrode 33, through the lead 52, through the inductor 53, through the lead 54 and back to the supply $E_Y$. By providing a sampling current I′, it is now possible to detect the magnetic component $B_S$ of the incident electromagnetic wave radiation. It will be noted that the magnetic bar 31 is appropriately dimensioned with the long dimension of approximately one-half wavelength at the frequency which it is desired to detect, or near the center of a given frequency band. Due to the high permeability of the material 31 and the dimensions, the magnetic component of the signal $B_S$ due to the traveling wave will induce a signal component of the flux density $B_S$ as indicated. This signal component of flux will exist in the magnetic material 31 as indicated at the same time and in the same physical space as the provided sampling flux B′ which has been previously described. These two fluxes will in no way detract from the operation of each other but on the contrary will cooperate to produce the desired signal voltage at the Hall terminals 36 and 37. Due to the signal flux $B_S$ and the sampling current I′, there will be an additional component of Hall voltage at the leads 36 and 37 due to this magnetic component $B_S$ of the incident signal.

To gain a somewhat more precise understanding of the operation of FIG. 6, we develop equations for the output Hall voltage and the electric and magnetic gain of the apparatus of FIG. 6. Equation 5 can be rewritten as Equation 17:

(17) $$V_H(t) = \frac{R_H}{a} \times B(t) I(t)$$

This is the general equation for the Hall effect where B and I are orthogonally related as we have indicated and $V_H$ is the output Hall voltage also orthogonally related to B and I. To gain an understanding of the derivation, refer to FIG. 7. FIG. 7 shows an electrical block diagram which is useful for indicating the relationship between the electric and the magnetic components of the incident radiation and the resulting output. The block with $G_B$ labeled on it represents the magnetic gain of the antenna and can be thought of as an amplifier with a gain $G_B$. Likewise, the block labeled $G_E$ represents the electric gain of the antenna for the electric component of the radiation. $S_{in}$ represents the incident radiation. The polarities given merely indicate the Hall effect is additive, that is, the Hall voltage produced by the electric component of the radiation can be made to reinforce the Hall voltage produced by the magnetic component of the radiation. This is simply a question of supplying the right polarities for $E_Y$ and $E_X$ in FIG. 6. The block 56 labeled "B gain control," represents a control circuit for the electric gain of the transducer which comprises the voltage supply $E_Y$, potentiometer 48, inductor 47 and so on. The block 55 labeled "E gain control" represents the coil 41, the electromotive source $E_X$, 46, and the resistors 44 and 45, etc. The output terminals 36 and 37 correspond to FIG. 6, the Hall output voltage terminals. There is no one physical point corresponding to the input terminals where $S_{in}$ is introduced. The input "terminals" are physically represented by magnetic bar 31, 31a, 31b and by the input electrical dipole circuit 34, 30 and 35. However, the relative polarities shown in FIG. 7 are correct. The output voltage, the Hall voltage, across the terminals 36 and 37 is the signal input multiplied by the sum of the magnetic gain plus the electric gain. We will use the thory of superposition to derive this and it may be observed that part of the process of superposition is roughly illustrated by observing that FIG. 1 and FIG. 4 when combined into the same apparatus can be visualized as creating FIG. 6. We have rewritten Equation 5 as Equation 17 as follows:

(17) $$V_H(t) = \frac{R_H}{a} \times B(t) + I(t)$$

Next, considering the apparatus of FIG. 6 operating to detect the magnetic component of the signal, we derive an equation for the magnetic component of the Hall voltage $V_H(t)$.

(18) $$V_H(t)_{\text{(Magnetic Signal)}} = \frac{R_H}{a} \times I'_{\text{sampling}} \times B(t)_{\text{signal}}$$

Equation 18 simply indicates that for detecting a magnetic signal, $I'$, a sampling current, will be supplied by the circuitry within block 56, such as the source 50 and potentiometer 48, etc. and that magnetic bar 31 will detect the magnetic component, $B_{\text{signal}}$, that is present in the incident radiation. From Equation 18 we can directly derive the magnetic gain of the antenna using the substitution that $B(t)$ equals $\mu H(t)_{\text{signal}}$. We can write Equation 19.

(19) $$B_{\text{gain}} = \frac{V_H(t)}{H_s(t)} = \frac{R_H}{a} \times \mu \times \frac{E_Y}{R'} = G_B$$

Equation 19 has also replaced $I'_{\text{(sampling)}}$ with $$\frac{E_Y}{R'}$$

where $R'$ here includes the resistance R of the sample itself plus the resistance in the control circuit, such as the potentiometer 48 at R3. It can be seen from Equation 19 that to produce a high gain antenna in terms of Hall voltage output per unit strength of magnetic intensity H, the Hall constant $R_H$ should preferably be as large as possible as we have indicated by choosing indium antimonide as the Hall material. Likewise, a magnetic material 31 with as large a permeability $\mu$ as possible should be used. The variable potential source $E_Y$ or alternately $E_Y$ in conjunction with the variable series resistance R3 means that the term $$\frac{E_Y}{R'}$$

which is the sampling current can be made as large or as small as desired. It should be noted that by making $E_Y$ relatively large, the magnetic gain $G_B$ of the antenna in FIG. 6 can be made arbitrarily large. This agrees with the discussion in connection with all the previous figures where it was also indicated that the gain of the magnetic antennas shown in FIGS. 1 and 4 could also be made arbitrarily large by supplying an appropriately large sampling current $I'$. It might also be noticed that compromise can be achieved between the Hall constant $R_H$ and the resistance $R'$. If physical ruggedness or heat dissipating ability should be desired for the Hall material 30, a relatively rugged material such as copper could be used which has a relatively lower resistance but also a relatively lower Hall constant. Any decrease in gain resulting from the change in the ratio of the Hall constant $R_H$ to the resistance R can be compensated for readily by using a larger voltage $E_Y$. Equation 19 also indicates in the design of FIG. 6 that it is highly desirable to use a relatively thin slab of material so that the dimension "a" parallel to which the flux passes is relatively thin. A compromise can be achieved between physical requirements for the support of the dipoles 34 and 35 and the required gain and the gain can always be brought up to any arbitrary level by using a larger supply voltage $E_Y$.

We will now derive the equation for the electric gain of the equipment of FIG. 6 and then the two forms of Equation 18, one for magnetic response and one for the electric response of the antenna will be combined by superposition to give an equation indicating the total response at the Hall terminals 36 and 37 for the simultaneous detection of both the magnetic and the electric components of the incident signal wave. Referring again to Equation 17, we can write Equation 20 to indicate the Hall voltage output when the detection is made of the electric component of the incident signal wave:

(20) $$V_H(t)_{\text{(Electric Signal)}} = \frac{R_H}{a} B'_{\text{sampling}} \times I(t)_{\text{signal}}$$

Grouping the constant terms, that is, the non-signal terms, within the bracket, we can write Equation 21.

(21) $$V_H(t)_{\text{(Electrical Signal)}} = \left[\frac{R_H}{a} \times B'_{\text{sampling}} \times \frac{1}{R}\right] \times E_S(t)_{\text{signal}}$$

Equation 21 has been rearranged to indicate that the electric component of the incident radiation $E_S(t)$ induces a signal current $I(t)$ which is simply $E_S(t)$ divided by R where R is the actual resistance of the sample 30 between the electrodes 32 and 33. The electric gain for the apparatus of FIG. 6 is derived in Equation 22.

(22) $$E_{\text{Gain}} = \frac{V_H(t)}{E_S(t)} = \frac{R_H}{a} \times \frac{1}{R} \times B'_{\text{sampling}} = G_E$$

Using the relationship $B$ equals $\mu H$ and the further relationship that ampere turns $I_X \times N1$ divided by the area of the magnetic rod 31 is equal to H, Equation 23 is written:

(23) $$E_{\text{Gain}} = \frac{V_H(t)}{E_S(t)} = \frac{R_H}{a} \times \frac{1}{R} \times \mu \times \frac{I_X N1}{\text{area}} = G_E$$

Equation 23 shows that the same factor of the Hall constant divided by the thickness of the material multiplied by the permeability of the magnetic loop 31 and divided by a resistance occurs as a factor in both the electric and the magnetic gain. The same comments apply to the selection of the materials for the Hall effect sample 30 and the magnetic material 31 and for the appropriate thickness $a$ of the Hall effect material. In Equation 23 for the electric gain, the further term $I_X \times N1$ divided by the area indicates that for a given magnetic loop 31, the gain of the antenna can be raised to a higher value simply by increasing the current supply $I_X$. This is accomplished by providing the circuitry shown in block 55 in FIGS. 6 and 7. Either the total resistance in the coil circuit, such as potentiometer 45, may be decreased or a larger voltage $E_X$ may be used, or both. In any event, it will be appreciated that the current $I_X$ may be made quite large and that the electric gain of the antenna also can be raised to any given level. The two gains derived in Equations 23 and 19 are the gains written in the amplifying blocks 57 and 58 for the explanatory diagram of FIG. 7. It will be appreciated that the total Hall output voltage in response to both the electric and the magnetic components of the signal wave can be obtained in Equation 24 by summing the electric response and the magnetic response:

(24) $$V_H(t) \text{ (Electric and Magnetic)} = \frac{R_H}{a} \times \left[I'_{\text{sampling}} \times B(t)_{\text{signal}} + B'_{\text{sampling}} \times \frac{E(t)_{\text{signal}}}{R}\right]$$

Equation 24 indicates that there are two components of the response of the Hall voltage. When a sampling current $I'$ is applied to the apparatus in FIG. 6 by block 56, for example, then a component of Hall voltage is produced by the multiplication of the induced magnetic field $B(t)_{signal}$ times the sampling current $I'$. Likewise, an additional component of the Hall voltage is produced when $B'$, a sampling flux, is applied to the apparatus by block 55 and a voltage is produced by multiplying the sampling flux $B'$ by the induced current $I_S(t)$, which is the signal electric field $E_S(t)$ divided by the resistance of the Hall material. Equation 25 is a further simplification of Equation 24 where the magnetic permeability $\mu$ has been brought out and the magnetic component of the signal expressed in terms of magnetic intensity $H(t)$ instead of magnetic flux density $B$.

(25)

$$V_H(t) \text{ Electric and Magnetic} = \frac{R_H \mu}{a} \times \left[ I'_{sampling} \times H(t)_{signal} + \frac{I_X N1}{R \times \text{area}} \times E(t)_{signal} \right]$$

(26)

$$V_H(t) \text{ Electric and Magnetic} = \frac{R_H \mu}{aR} \left[ E'_Y \times H(t)_{signal} + \frac{I_X N1}{\text{area}} E(t)_{signal} \right]$$

In Equation 26 the total response at the Hall terminals 36 and 37 has the further constant factor $R$ the resistance brought out. Resistance $R$ of the Hall sample has been brought out and the voltage $E_Y'$ represents the net voltage across the voltage source $E_Y$ and the potentiometer 48 considered as a block 56. Equation 26 shows that there are two additive components of the output response of the antenna of FIG. 6, namely, $H(t)_{signal}$, a magnetic component of the signal and $E_S(t)$, an electric component of the signal. The gain of the magnetic output voltage can be controlled by increasing $E'_Y$ indicated by the multiplication of $H(t)_{signal} \times E'_Y$. Equation 26 indicates the component of the Hall voltage indicated by the product of the control voltage $E'_Y$ and the magnetic component of the signal $H_S(t)$ can be made arbitrarily large by using a suitable large voltage $E'_Y$. Added to this term is the response voltage component due to sampling magnetic field $$\frac{I_X N1}{\text{area}}$$

multipled by the electric components $E_S(t)$ of the signal, that is, $I_X \times N1$ divided by the area of the magnetic loop 31 times $E_S(t)$ the electric component of the signal wave. Likewise, the electric component of the Hall voltage output can be made arbitrarily large by introducing a suitably large $I_X$ and using a suitable coil 41 with a large number of turns, $N1$. Terms $R_H$, $\mu$, $a$ and $R$ are constants which will be general increase the gain of the antenna but which remain fixed once the physical dimensions and the type of material is chosen for the Hall sample, and for the magnetic material 31.

It should be noted that if it is desired to use the transducer of FIG. 6 to receive the electric component of the signal wave alone, the source $E_Y$ is reduced to zero volts, and there will be provided no sampling electric field. If the source $E_Y$ is reduced to zero, there will be no sampling current $I'$ provided and the magnetic components of the wave will not be detected. Likewise, if it is desired to detect the magnetic component of the signal alone, if the source $E_X$ is reduced to zero or the resistance R2 made very large, there will be no current $I_X$ in the coil 41 and there will be no sampling flux field for the electric component of the wave to react with. Hence, the Hall output voltage will then have only a magnetic component and no electric component. Thus, the output of the antenna can be made to contain either the electric component alone or the magnetic component alone or both components, as indicated in Equation 26.

The inductors L1 and L2 help to provide a relatively high impedance for complex frequency signals induced by the electric component of the signal wave in the dipoles 34 and 35. As a result, the relatively weak signal radiation is not shorted out through the supply $E_Y$ and the potentiometer 48 because the inductors L2 and L2 provide an effective A.C. impedance isolation from the time varying components of the signal radiation. At the same time, L1 and L2 readily allow D.C. sampling current $I'$ to be passed through the sample so that the magnetic components of the signal may be detected. Likewise, the resistor R1 insures that if the potentiometer R2 is shorted out, the magnetic component of the signal wave will not be shorted out by the terminals of the coil 41 being shorted through a low impedance. R1 also serves to isolate the electric gain control circuit 55 from the magnetic component, $B_S$ of the signal.

Figure 9:
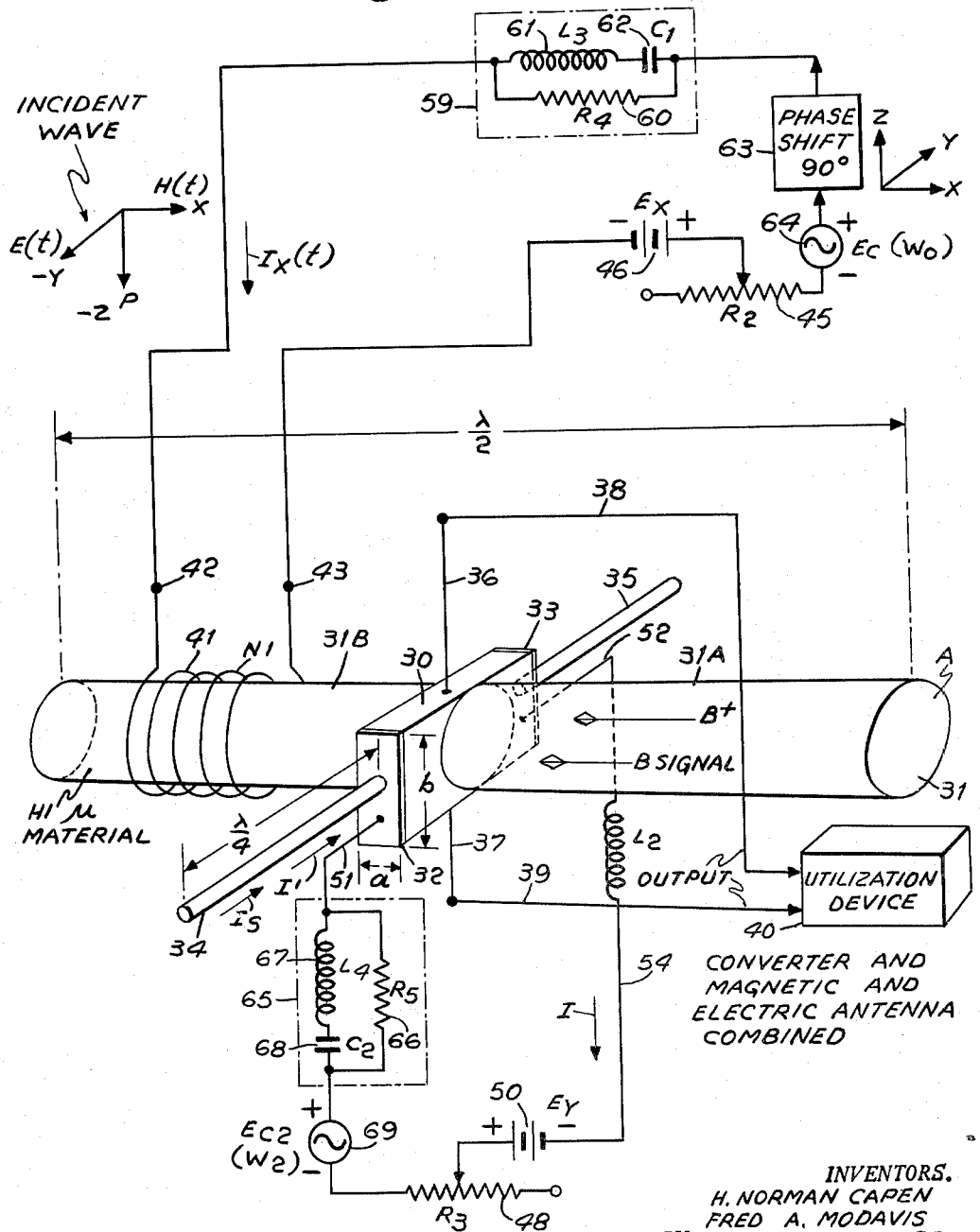
FIG. 9 is a perspective view of another embodiment of our invention.

FIG. 8 is a top plan view of FIGS. 6 and 9. FIG. 8 indicates that the leads 36 and 37 and 38 and 39 and 51 and 52 need not be kept in orthogonal relationship once they have detected the Hall voltage at the surface of the Hall sample 30 and these leads may be flexed or bent to conduct the appropriate signals through the control circuits 56 and 55 and to the utilization device 40. A dot is used to indicate a flux vector coming out of the paper toward the reader and a cross is used to indicate the flux vector going into the paper.

It should also be noted that the antennas of FIGS. 6 and 9 exhibit a very high degree of directivity. A traveling electromagnetic wave front can be represented by an H vector for the magnetic component and an E vector for the electric component of the wave. These two components are always at right angles to each other and in time phase. In the left hand corner of FIG. 6 such a wave front (incident wave) is shown oriented so that it would be received with maximum reception by the transducer 29. The E vector points towards the negative Y direction and the H vector points towards the positive X direction. This coincides with the way the apparatus in FIG. 6 was oriented for the purposes of illustration, that is, with the magnetic bar lying in the X, Z plane and the electric structure 34, 35 lying in the Y, Z plane and Hall output being obtained at 36 and 37 in the Y, X plane. In general, Equation 26 indicates that the directivity of the antennas of FIGS. 6 and 9 will be appreciably sharper than that of an ordinary antenna which only detects the electric component of the incident radiation. Both the electric output and the magnetic output of the Hall volage will both decrease together as the antennas of FIG. 6 and FIG. 9 are rotated from alignment with the incident radiation vectors. It should also be noted that the antenna of FIG. 6 will perform excellently to determine the exact orientation of an incident wave in space because the antenna can be first rotated in one plane to maximize the magnetic component of the output signal and then the antenna can be held and rotated about the resulting maximum plane in a plane at right angles to the maximum magnetic plane to determine the maximum orientation for reception of the electric vector. At the point of maximums of both components, the antenna will be lined up exactly square or in exact coincidence with the orthogonal incident wave. Inspection of Equation 26 indicates how a combined transducer that would serve as both a frequency converter and a magnetic and electric antenna can be constructed. If the voltage $E'_Y$ were varied, or modulated, and if the current $I_X$ were modulated, then both the electric component of the signal and the magnetic component of the signal would be also modulated in the resulting Hall voltage output because $E'_Y$ and $H(t)$ of the signal and $I_X$ are multiplied by $E(t)$ of the signal. FIG. 9 shows means for modulating both the magnetic sampling flux $B'$ and the sampling current $I'$ connected to apparatus similar to that shown in FIG. 6. Coil 41 is connected at terminal 42 to an isolation filter shown as 59. The filter 59 is composed of a resistor R4, element 60, an inductor L3, element 61, and a capacitor C1, shown as 62. The filter section 59 is connected in series with a 90 degree phase shift circuit 63 which is, in turn, connected in series with a modulation generator 64 shown as $E_C$. $E_C$ may operate typically at a carrier frequency $\omega_0$, or if desired, the generator $E_C$ might introduce a complex modulating waveform but, in either case, the operation of our device will be the same. As before, potentiometer R2, shown as 45 and a source of electromotive potential $E_X$, shown as 46, complete the series circuit with the coil terminal 43. The generator 64 provides a means of introducing the time varying modulation into the sampling field B' so that the sampling field B' varies as the current $I_X$ is varied by the generator $E_C$. This results in the current $I_X$ in Equation 26 having both a steady D.C. component due to the source $E_X$, 46, and a time varying component due to the voltage generator $E_C$. This will produce an output modulation component at the terminals 36 and 37 in FIG. 9 in the resulting Hall voltage representing the detection of the electric field of the incident wave. This operation is similar to that illustrated in FIG. 5 which showed a combined electric antenna and frequency converter.

There is also shown in FIG. 9 a filter 65 composed of resistor R5, element 66, an inductor 67 shown as L4 and a capacitor C2 shown as 68. The resistor R5 provides a path for the D.C. or steady component of sampling current I' to enter the lead 51 as supplied by the source $E_Y$ at 50. A second complex signal generator EC2 shown as 69 is connected in series with the filter 65 and the potentiometer 48. The generator 69 would in general operate at a frequency $\omega_2$. The generator 60 will cause the sampling current I' to contain a time varying component at the frequency $\omega_2$. Referring to Equation 26, this will cause the value of the voltage $E'_Y$ to vary because in FIG. 9 the voltage $E'_Y$ is equal to the sum of $E_Y$ from the source 50 and $E_{C2}$ from the generator 69.

Hence, the variation of the generator 69 will cause a modulation to be imposed upon the magnetic component of the Hall voltage indicated as the product of $E'_Y$ and $H(t)$ signal in Equation 26. In the usual case, frequency $\omega_2$ of the generator 69 will be exactly the same frequency as the frequency $\omega_0$ of the generator 64 and, in fact, the same generator connected in parallel can be used at both points. The inductor 61 and the capacitor 62 are tuned so that they resonate at the frequency $\omega_0$. A path of very low impedance to conduct the modulation signal from the generator 64 through the coil 41 will be formed. Resistor 60 provides a path for the constant component of the electric gain control current $I_X$ provided by the supply 46. Likewise, the inductor 67 is resonated with the capacitor 68 at the frequency $\omega_2$. A path of low impedance will be provided for the modulating voltage provided by the generator 69 at the frequency $\omega_2$. In the most usual case it will be desirable to make $\omega_0$ equal to $\omega_2$ and to use the same generator at 69 and 64 by parallel connections.

If generators at the same frequency and fixed phase are used, or one generator is used connected in parallel, one further modification is required to provide an appropriately modulated signal at the Hall terminals 36 and 37 of FIG. 9. This is the phase shift circuit 63. It will be appreciated from Equation 16 that the complex term $j\omega_0 L$, where L is the inductance of the coil 41, represents a 90 degree phase shift between the current $I_X(t)$ and the voltage $E_C$ in the coil circuit of the coil 41. However, in the sampling current circuit 51 containing the generator 69, there will be no such inductive shift of phase between the current and the voltage, that is, between $E_{C2}$ and the voltage I' entering lead 51. Hence, for the usual type of modulation the phase shift 63 is made a 90 degree capacitive phase shift, that is, a circuit providing a 90 degree phase shift so that the current through 63 leads the voltage by 90 degrees. Then the current $I_X(t)$ in the coil 41 can be made to be in phase with the current I' in the leads 51 and 52 so that both the magnetic modulation and the electric modulation are at the same frequency and in the same phase with each other. This will produce the normal type of amplitude modulation contained at the terminals 36 and 37. Both the electric and the magnetic gains may be varied independently by the adjustments of the potentiometers 45 and the supply 46 and the potentiometer 48 and the supply 50. Thus, FIG. 9 is a combined transducer that is both a frequency converter and a magnetic and electric antenna wherein the separate magnetic and electric gains may be made as high or as low as is desired independently and wherein a Hall voltage may be produced which has components that are both electric and magnetic. This Hall voltage output may have the electric component modulated at a different frequency or with a different waveform from the modulation impressed upon the magnetic component of the Hall output voltage. It should be pointed out that other means of varying the currents I' and $I_X$ may be readily used without departing from the scope of our invention. For example, current generators could be used instead of the voltage generators $E_C$, $E_Y$ and $E_X$.

While we have described above the principles of our invention in connection with specific apparatus, it is to be clearly understood that this description is made only by way of example and not as a limitation to the scope of our invention as set forth in the objects thereof and in the accompanying claims.

We claim:

1. A magnetic and electric antenna for detecting both the magnetic component and the electric component of incident electromagnetic radiation comprising material exhibiting the Hall effect, first focusing means to focus the electric component of the incident electromagnetic radiation in said material, first sampling means for providing a sampling magnetic field in said material disposed in orthogonal relationship with said first focusing means, second focusing means in orthogonal relationship with said first focusing means for focusing the magnetic component of the incident electromagnetic radiation in said material, second sampling means connected to said material for providing a sampling electric current in said material disposed in orthogonal relationship with said second focusing means, and output means connected to said material and disposed in orthogonal relationship with said first focusing means and said second focusing means whereby the output of said antenna is proportional to both the electric component and the magnetic component of said incident electromagnetic radiation.

2. A magnetic and electric antenna for detecting both the magnetic and the electric components of incident electromagnetic radiation comprising material exhibiting the Hall effect, means for focusing the electric component of the incident radiation in said material, a magnetic loop of high permeability material coupled to said Hall effect material and orthogonally disposed with respect to said electric component focusing means, first controllable means for providing a magnetic field coupled to said magnetic loop whereby a sampling magnetic field is provided within said magnetic loop and said Hall effect material, and said magnetic loop focuses the magnetic component of the incident radiation in said Hall effect material, second controllable means connected to said Hall effect material to provide a controllable sampling electric current in a direction orthogonal to said magnetic loop, and output means connected to said Hall effect material and disposed in orthogonal relationship to both said magnetic loop and said electric component focusing means whereby the output of said antenna is proportional to both the magnetic component of said incident radiation and the electric component of said incident radiation.

3. A combined frequency converter and antenna for incident electromagnetic radiation comprising material exhibiting the Hall effect, means to focus the magnetic component of the incident electromagnetic radiation in said material, means to provide a steady sampling of electric energy, means to provide a varying sampling of electric energy derived from an electromagnetic generator, means coupling said steady sampling electric energy to said varying sampling electric energy, means coupling said combined electric energies to said material and output means coupled to said material to produce an output proportional to the interaction of said focussed magnetic component of said incident electromagnetic radiation and said sampling electric energies whereby said output is proportional to said focussed component and to desired variations of said sampling electric energies.

References Cited by the Examiner

UNITED STATES PATENTS

| | | | |
|---|---|---|---|
| 1,825,855 | 10/31 | Craig | 330—6 X |
| 2,581,348 | 1/52 | Bailey | 343—787 X |
| 2,936,373 | 5/60 | Welker et al. | 307—88.5 X |
| 2,978,545 | 4/61 | Howling. | |
| 3,001,122 | 9/61 | Duinker | 324—45 X |

WALTER L. CARLSON, *Primary Examiner.*

FREDERICK M. STRADER, *Examiner.*